UNITED STATES PATENT OFFICE.

DANIEL D. JACKSON, OF BROOKLYN, NEW YORK.

PROCESS OF OBTAINING POTASSIUM FROM NATURAL POTASSIUM COMPOUNDS.

1,417,919.     Specification of Letters Patent.     Patented May 30, 1922.

No Drawing.     Application filed June 29, 1920. Serial No. 392,733.

*To all whom it may concern:*

Be it known that I, DANIEL D. JACKSON, a citizen of the United States, and a resident of Brooklyn, in the county of Kings and State of New York, have invented a new and useful Improvement in Processes of Obtaining Potassium from Natural Potassium Compounds, of which the following is a specification.

My invention relates to processes for obtaining potassium from natural potassium compounds. It has for its object to obtain a simple soluble compound of potassium in large quantities from natural potassium compounds such as glauconite or green sand; also to obtain such soluble potassium compounds in an inexpensive manner and at a relatively low temperature. It consists of the new and improved process hereinafter set forth.

I mix the compound containing potassium, such as glauconite or green sand, with a relatively small proportion of lime, such as pulverized lime or lime rock, and combine with it a haloid salt, such as sodium chloride or calcium chloride, and heat the mixture in a kiln, preferably of the rotary type, to a temperature below the fusion point of the mixture but high enough to produce a vapor pressure of the potassium chloride which is formed, sufficient to cause the potassium chloride to be rapidly volatilized. In practice I preferably take glauconite and mix it in suitable proportions with pulverized lime or lime rock, and a sufficient amount of the sodium chloride or calcium chloride to combine with all of the potassium present in the mixture and form potassium chloride. The mixture is thoroughly mixed and ground and subjected to the proper degree of temperature in a kiln, neither too high nor too low. I have found that it is not necessary to use more lime than a quantity equal to that of the glauconite, and perfectly satisfactory results may be obtained with a mixture of two parts of glauconite to one of lime provided a sufficient amount of sodium chloride or calcium chloride is used to react with all of the potassium present in the mixture. In order to obtain as high a percentage of potassium as possible, I find it advisable to increase the glauconite and decrease the lime in the mixture so that a mixture of two of glauconite to one of lime gives more satisfactory results and produces more potassium halide.

The temperatures in the kiln must be carefully controlled and must be kept below the fusion point of the mixture which begins in the case of a one to one mixture at about 1200° C., and in the case of a two to one mixture at a slightly lower point. Above the fusing point it is impossible to volatilize a material amount of the potassium halide from low lime mixtures, as it becomes dissolved or combined with the other ingredients in a non-volatilizable condition.

The temperatures should be maintained at a sufficiently high point so that the vapor pressure of the potassium chloride formed is high enough to cause it to be rapidly volatilized. In practice the temperature should be kept above 1050° C., and preferably between 1150° C. and 1190° C.

With different proportions and varying conditions of the raw materials used, the degree of temperature best suited will vary somewhat, but in practice I have found the temperatures above stated to give satisfactory results.

What I claim as new and desire to secure by Letters Patent, is:

1. The process of obtaining potassium salts from mixtures containing a natural potassium compound which consists in mixing together the said material with lime and a haloid salt, and heating the mixture at temperatures below the clinkering temperature range of the mixture but high enough to give a vapor pressure of potassium halide which cause its rapid volatilization.

2. The process of obtaining potassium salts from glauconite which consists in mixing together the glauconite, lime and a haloid salt, and heating the mixture at temperatures below the clinkering temperature range of the mixture but high enough to give a vapor pressure of potassium halide which will cause its rapid volatilization.

3. The process of obtaining potassium salts from mixtures containing a natural potassium compound which consists in mixing together the said material with lime and a chloride salt, and heating the mixture at temperatures below the clinkering temperature range of the mixture but high enough to give a vapor pressure of potassium chloride which will cause its rapid volatilization.

4. The process of obtaining potassium salts from glauconite which consists in mixing together the glauconite, lime and a chloride salt, and heating the mixture at temperatures below the clinkering temperature range of the mixture but high enough to give a vapor pressure of potassium chloride which will cause its rapid volatilization.

5. The process of obtaining potassium salts from glauconite which consists in mixing together glauconite and lime in the proportions of two parts of glauconite to one part of lime, and a haloid salt in sufficient quantities to combine with substantially all of the potassium of the glauconite, and heating the mixture at temperatures below the fusion point of the mixture but high enough to give a vapor pressure of potassium halide which will cause its rapid volatilization.

6. The process of obtaining potassium chloride from glauconite which consists in mixing together glauconite and lime in the proportions of two parts of glauconite to one part of lime, and a chloride salt in sufficient quantities to combine with substantially all of the potassium of the glauconite, and heating the mixture at temperatures below the fusion point of the mixture but high enough to give a vapor pressure of potassium chloride which will cause its rapid volatilization.

7. The process of obtaining potassium salts from mixtures containing a natural potassium compound which consists in mixing together the said material, lime and a haloid salt, and heating the mixture at temperatures below 1200° C. and above 1050° C.

8. The process of obtaining potassium salts from mixtures containing a natural potassium compound which consists in mixing together the said material, lime and a haloid salt, and heating the mixture at temperatures between 1150° C. and 1190° C.

9. The process of obtaining potassium salts from glauconite which consists in mixing together the glauconite, lime and a haloid salt, and heating the mixture at temperatures below 1200° C. and above 1050° C.

10. The process of obtaining potassium salts from glauconite which consists in mixing together the glauconite, lime and a chloride salt, and heating the mixture at temperatures below 1200° C. and above 1050° C.

11. The process of obtaining potassium salts from glauconite which consists in mixing together the glauconite, lime in the proportion of two parts of glauconite to one part of lime, and a haloid salt in proportion to unite with substantially all the potassium in the glauconite, and heating the mixture at temperatures below 1200° C. and above 1050° C.

12. The process of obtaining potassium salts from glauconite which consists in mixing together the glauconite, lime in the proportion of two parts of glauconite to one part of lime, and a chloride salt in proportion to unite with substantially all the potassium in the glauconite, and heating the mixture at temperatures below 1200° C. and above 1050° C.

In testimony whereof, I have signed my name to this specification.

DANIEL D. JACKSON.